United States Patent [19]

Matsui et al.

[11] Patent Number: 4,709,621
[45] Date of Patent: Dec. 1, 1987

[54] INTERNAL COMBUSTION ENGINE PISTON AND A METHOD OF PRODUCING THE SAME

[75] Inventors: Minoru Matsui, Nagoya; Nobuo Tsuno, Kasugai, both of Japan

[73] Assignee: NGK Insulators, Ltd., Nagoya, Japan

[21] Appl. No.: 708,404

[22] Filed: Mar. 5, 1985

[30] Foreign Application Priority Data

Mar. 13, 1984 [JP] Japan .................................. 59-46411

[51] Int. Cl.$^4$ ................................................ F02F 3/12
[52] U.S. Cl. .............................. 92/212; 29/156.5 R; 92/213; 92/224; 123/193 P
[58] Field of Search ...................... 29/156.5 R; 92/176, 92/212, 213, 218, 220, 222, 224, 231, 260, 248; 123/193 P, 669

[56] References Cited

U.S. PATENT DOCUMENTS

| 1,229,133 | 6/1917 | Pogue | 92/213 |
| 4,433,616 | 2/1984 | Hauser | 92/220 X |
| 4,530,341 | 7/1985 | Palm | 123/669 |

FOREIGN PATENT DOCUMENTS

| 3017787 | 11/1981 | Fed. Rep. of Germany . | |
| 3214093 | 10/1983 | Fed. Rep. of Germany ... | 129/193 P |
| 60306 | 5/1979 | Japan . | |
| 57-2444 | 1/1982 | Japan .............................. | 123/193 P |
| 48327 | 4/1983 | Japan . | |
| 74853 | 5/1983 | Japan . | |
| 1439328 | 6/1976 | United Kingdom . | |
| 1577685 | 10/1980 | United Kingdom . | |

*Primary Examiner*—Gerald A. Michalsky
*Attorney, Agent, or Firm*—Parkhurst & Oliff

[57] ABSTRACT

Disclosed herein is an internal combustion engine piston having a metal piston body and a piston cap constituted by a plurality of ceramic pieces and fixed to the top portion of the metal piston body, wherein the piston cap is composed of at least one kind of a ceramic material, at least one of the ceramic pieces is fixed to the metal piston body through fitting or through engagement by way of a metallic piece secured onto said at least one ceramic piece, and the remaining ceramic piece or pieces are fixed onto the metal piston body by means of said at least one ceramic piece. A method for producing an internal combustion engine piston is also disclosed, which method includes steps: forming the piston cap from at least one kind of a ceramic material, forming a fitting projection on at least one of the ceramic pieces constituting the piston cap, fixing said at least one of the ceramic pieces onto the metal piston body through fitting the fitting projection to a through hole or depression formed at the top portion of the metal piston body, and fixing the remaining ceramic piece or pieces onto the metal piston body by means of said at least one of ceramic pieces fixed to the metal piston body.

3 Claims, 3 Drawing Figures

INTERNAL COMBUSTION ENGINE PISTON AND A METHOD OF PRODUCING THE SAME

BACKGROUND OF THE INVENTION (1) Field of the Invention

The present invention relates to an internal combustion engine piston in which a piston cap constituted by a plurality of ceramic pieces is fixed to the top portion of a piston body made of a metal, and a method of producing the same.

(2) Description of the Invention

Since ceramic materials have excellent mechanical strength, heat resistance, oxidation resistance, and heat insulating properties, when a portion of a piston, a cylinder liner, a cylinder head and so on of an internal combustion engine, which portion is to be brought into contact with a high temperature combustion gas, is constituted by the ceramic material, an increase in combustion temperature and reduction in heat loss can be attained to result in improved engine efficiency and reduction in harmful components in the exhaust gas can be expected. Thus, here have been proposed internal combustion engine pistons in which a piston cap made of ceramics is fixed to the top portion of a metal piston body.

The engine pistons in which the ceramic piston cap is fixed to the top portion of the metal piston body are disclosed in, for instance, Japanese Patent Application Laid-Open No. 74,853/1983, U.S. Pat. No. 4,404,935 and U.S. Pat. No. 4,245,611. Among them, Japanese Patent Appllication Laid-Open No. 74,853/1983 and U.S. Pat. No. 4,404,935 disclose pistons in which a ceramic piston cap having an integral structure is fixed to the top portion of a metal piston body by casting or engagement.

In general, since the ceramic material has a lower heat conductivity, there occurs a large difference in temperature between the high temperature combustion gas-contacting surface and the metal piston body-contacting surface of the ceramic piston cap which is fixed to the top portion of the metal piston body. Therefore, the ceramic piston cap with such an integrated structure has the drawback that the piston cap tends to be broken due to thermal stress caused by the large temperature difference, and this tendency becomes conspicuous as the size of the piston increases.

On the other hand, U.S. Pat. No. 4,245,611 discloses a piston in which a piston cap constituted by a plurality of ceramic pieces is fixed to the top portion of a metal piston body through casting. According to this piston, a cushioning layer composed of ceramic fibers is provided around the piston cap to mitigate the stress caused through the casting. However, this structure has the drawback that the fixing of the ceramic piston cap to the metal piston body becomes insufficient due to the presence of the cushioning layer so that the piston cap becomes loose when the piston is in use. Further, Japanese Patent Utility Model registration Publication No. 48,327/1983 and Japanese Patent Application Laid Open No. 60,306/1979 disclose pistons in which a molten metal is directly cast around a piston cap constituted by a plurality ceramic pieces. However, the method by which the piston cap, split into the plurality of ceramic pieces is insert cast and fixed to the top portion of the metal piston body has the drawback that the assembling of the piston cap into a mold is complicated, and therefore this method is unsuitable for mass production. Further, the piston in which the ceramic piston cap is fixed to the metal piston body through casting has the drawback that the ceramics fracture when thermal treatment such as quenching is effected.

SUMMARY OF THE INVENTION

It is therefore an object of the present invention to provide an internal combustion engine piston which obviates the drawbacks encountered by the prior art engine pistons.

More specifically, the object of the present invention is to provide an internal combustion engine piston having heat insulating properties, heat resistance, and/or corrosion resistance with a ceramic piston cap which is firmly fixed to the top portion of a metal piston body and is not broken by thermal stress and structural stress.

It is another object of the present invention to provide a method of producing such an internal combustion engine piston.

It is still another object of the present invention to provide an internal combustion engine piston in which a ceramic piston cap is fixed to the top portion of a metal piston body without deteriorating the mechanical strength of the metal piston body.

According to a first aspect of the present invention, there is a provision of an internal combustion engine piston in which a piston cap constituted by plurality of ceramic pieces is fixed to the top portion of a metal piston body, the piston cap is made of one or more kinds of ceramic materials, and at least one of the ceramic pieces is fixed to the metal piston body through fitting or through engagement via a metallic member secured to this ceramic piece, while the remaining ceramic piece or pieces are fixed to the metal piston body by means of said at least one ceramic piece fixed to the metal piston body.

According to another aspect of the present invention, there is a provision of a method of producing an internal combustion engine piston by fixing a piston cap constituted by plurality of ceramic pieces to the top portion of a metal piston body, which comprises the steps of: forming the piston cap from one or more kinds of ceramic materials, forming a fitting projection in at least one of the ceramic pieces constituting the piston cap, fitting the projection into a through hole or depression formed in the top portion of the metal piston body to fix said at least one ceramic piece to the metal piston body, and fixing the remaining ceramic piece or pieces onto the metal piston body by means of said at least one ceramic piece already fixed to the metal piston body.

According to still another aspect of the present invention, there is a provision of a method of producing an internal combustion engine piston by fixing a piston cap constituted by plurality of ceramic pieces to the top portion of a metal piston body, which comprises the steps of: forming the piston cap from one or more kinds of ceramic materials, forming a projection in one of the ceramic pieces constituting the ceramic piston cap, securing a metallic member onto the projection, engaging the metallic member with a through hole or depression formed in the top portion of the metal piston body to fix said one ceramic piece to the metal piston body, and fixing the remaining ceramic piece or pieces onto the metal piston body by means of said one ceramic piece already fixed to the metal piston body.

These and other objects, features and advantages of the invention will be appreciated upon reading of the following description of the invention when taken in conjunction with the attached drawings with understanding that some modifications, variations and changes of the invention could be easily made by the skilled in the art to which the invention pertains without departing from the spirit of the invention or the scope of claims appended hereto.

BRIEF DESCRIPTION OF THE DRAWINGS

For better understanding of the invention, reference is made of the attached drawings, wherein.

DETAILED DESCRIPTION OF THE INVENTION

Figure 1:
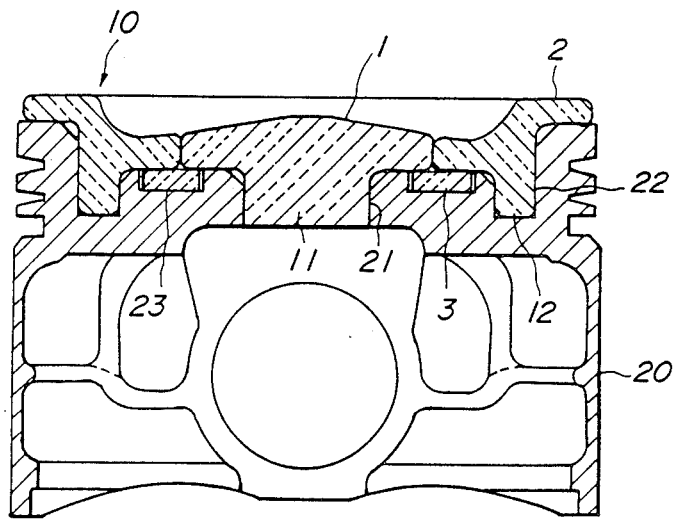
FIG. 1 is a schematic view illustrating a vertical section of the structure of an embodiment of the internal combustion engine piston according to the present invention.

According to the present invention, a piston cap is constituted by a plurality of split ceramic pieces. This reduces the thermal stress caused by the difference in temperature between the surface of the ceramic pieces constituting the piston cap which is brought into contact with a high temperature combustion gas and the surface of the ceramic piece which is in contact with the metal piston body to prevent the piston cap from being broken when an engine is in operation.

The ceramic pieces constituting the piston cap are made of one or more kinds of ceramic materials selected from the group consisting of zirconia, alumina, silicon nitride, silicon carbide and sialon.

The configuration of the ceramic pieces constituting the piston cap is determined with due consideration being given to the configuration and size of the piston cap, the physical properties and the mechanical properties of the ceramic material, the manner of fixing the ceramic pieces and the metal piston body, the feasibility of producing the ceramic pieces, the thermal conditions within an engine so that thermal stress expected to occur within the piston cap may not become larger than the fracture stress of the ceramic pieces.

Any one of a horizontal surface, a vertical surface, an inclination surface, and a curved surface may be selected as the profile and inclination of the contact surface between the ceramic pieces constituting the piston cap depending upon the manner of fixing the ceramic pieces to the metal piston body, the profile of the ceramic pieces and so on.

The ceramic pieces constituting the piston cap may be made of the same ceramic material or different ceramic materials. In this case, the ceramic material to be used for the piston cap may be determined depending upon the thermal shock resistance characteristics, the corrosion resistance, the heat insulating property, and the thermal expansion characteristics of the ceramic material and the manner of fixing the piston cap to the metal piston body. For instance, while a portion of the piston cap which is subjected to a large thermal shock is preferably made of a ceramic material having a small coefficient of thermal expansion, such as silicon nitride and silicon carbide, a portion of the piston cap which is directly bonded to the metal piston is preferably made of a ceramic material having a coefficient of thermal expansion near that of the metal constituting the piston body, such as zirconia and alumina.

Although a ceramic material having a small coefficient of thermal expansion, such as silicon nitride and silicon carbide, has excellent thermal resistance and thermal shock resistance characteristics, the heat insulating property is not as good when compared with zirconia. Therefore, in the case of the engine piston which particularly requires heat insulating properties, such as a heat insulating engine piston, it may be that all the ceramic pieces constituting the piston cap are made of a zirconia ceramic having an excellent heat insulating property, or a portions of the piston cap may be designed to have a plurality of layers in which the ceramic pieces at the surface layer portion, which is brought into direct contact with the high temperature combustion gas, is made of silicon nitride and those at the inner layer portion, which is brought into no contact with the combustion gas, is made of zirconia ceramics.

The ceramic pieces constituting the piston cap are fixed to the metal piston body by a mechanical bonding such as shrinkage fitting, press fitting and interference fitting. In this case, at least one of the ceramic pieces constituting the piston cap is directly fixed to the metal piston body, and the remaining ceramic piece or pieces are fixed to the metal piston body by means of said at least one already fixed ceramic piece.

Further, a metallic member can be secured to at least one of the ceramic pieces, and this ceramic piece is engaged with the metal piston body through the metallic member, the remaining ceramic piece or pieces are fixed to the metal piston body by means of the said at least one ceramic piece already fixed to the metal piston body. The ceramic piece and the metallic member are fixed together through press fitting, shrinkage fitting or bonding through a metallized layer.

When the ceramic piece and the metallic member are fixed together through fitting, the material and the dimension of the metallic member may be determined to meet the following two points with due consideration being given to the dimension of the fitting portion, the coefficient of thermal expansion of the ceramic piece, the use temperature at the fitting portion and so on.

(1) The fitting portion has an interference enough to maintain a necessary tightening force at the use temperature of the piston.
(2) The bonding portion between the metallic member and the metal piston body has a necessary strength at the use temperature of the piston.

When the metal piston body is made of a metal having a high melting point, such as cast iron, the metallic member secured to the ceramic piece and the metal piston body may be engaged together through any one of shrinkage fitting, screwing, welding, and brazing.

When the metal piston body is made of a metal having a low melting point such as aluminum alloy, the engagement is preferably performed by screwing or shrinkage fitting.

Next, the present invention will be explained more in detail with reference to the embodiments shown in the drawings. These embodiments are merely illustrative of the invention, and should not be interpreted to limit the scope thereof.

FIG. 1 is a vertically sectional view of an internal combustion engine piston according to the present invention in which a portion of ceramic pieces constituting a piston cap is directly fixed to a metal piston body through shrinkage fitting. This piston comprises the piston cap 10 consisting of the ceramic pieces 1 and 3 made of zirconia and the ceramic piece 2 made of silicon nitride and the piston body 20 made of nodular graphite cast iron. A cylindrical projection 11 formed on the ceramic piece 1 is fitted into a through hole 21 provided in the top central portion of the metal piston body. A cylindrical projection 12 formed on the ceramic piece 2 is fitted into a depression 22 provided in an annular groove formed on the top portion of the metal piston body. The annular disc-like ceramic piece 3 is arranged in a depression 23 formed in an annular groove in the top portion of the metal piston body. This ceramic piece 3 is fixed to the inside of the depression 23 by means of the ceramic pieces 1 and 2. The ceramic piece 3 may be designed in an integral structure or in a split structure.

The ceramic piece 1 and the ceramic piece 2 may be fixed in the state that they are brought into close contact with each other. The state in which the ceramic pieces 1 and 2 are brought into close contact with each other is preferable because when the engine is in operation to increase the temperature of the ceramic pieces, the increase in the outer diameter of the ceramic piece 1 exceeds that in the inner diameter of the ceramic piece 2 since the thermal expansion of the ceramic piece 1 is larger than that of the ceramic piece 2, whereby the ceramic piece 2 is pushed against the wall surface of the depression in the top portion of the metal piston body to prevent the ceramic piece from slipping off from the metal piston body. In this case, a buffer member may be interposed between the contact surfaces of the ceramic pieces 1 and 2.

When the coefficient of thermal expansion of the ceramic piece 1 is the same as or less than that of the ceramic piece 2, the equivalent effect can be obtained when the ceramic piece 1 and the ceramic piece 2 are fixed relative to each other in the interference fitted state. The peripheral edge portion of each of the ceramic pieces is bevelled or rounded to avoid stress concentration thereupon.

This piston may be produced by the following process.

The ceramic pieces are fired, and then processed into desired profiles. Then, a through hole 21 and depressions 22 and 23, into which ceramic pieces are to be fitted, are formed in specified dimensions in the top portion of the metal piston body. Thereafter, after the ceramic piece 3 is placed in the depression 23, the metal piston body with the ceramic piece 23 is heated at a temperature of not higher than the transformation point of nodular graphite cast iron. Then, the projection 11 on the ceramic piece 1 and the projection 22 on the ceramic piece 2 are both maintained at ordinary temperature and are shrinkage fitted into the through hole 21 and the depression 22, respectively.

When the ceramic piece 1 and the ceramic piece 2 are fixed relative to each other through interference fitting, the ceramic pieces 1 and 2 are shrinkage fitted to the metal piece piston body independently. That is, after the ceramic piece 2 is first shrinkage fitted to the metal piston body, the metal piston body with the ceramic pieces 2 and 3 is heated again at the above temperature to make the inner diameter of the ceramic piece 2 larger than the outer diameter of the ceramic piece 1, and the projection 11 of the ceramic piece 1, kept at ordinary temperature, is shrinkage fitted into the through hole 21 of the piston body, followed by cooling. As obvious from the above process, the piston may be produced by expansion fitting. It is preferable that piston ring grooves and the outer periphery of the metal piston body are machined before the piston cap is fitted to the metal piston body so as to avoid the fracture of the ceramic pieces due to the shock during machining.

Figure 2:
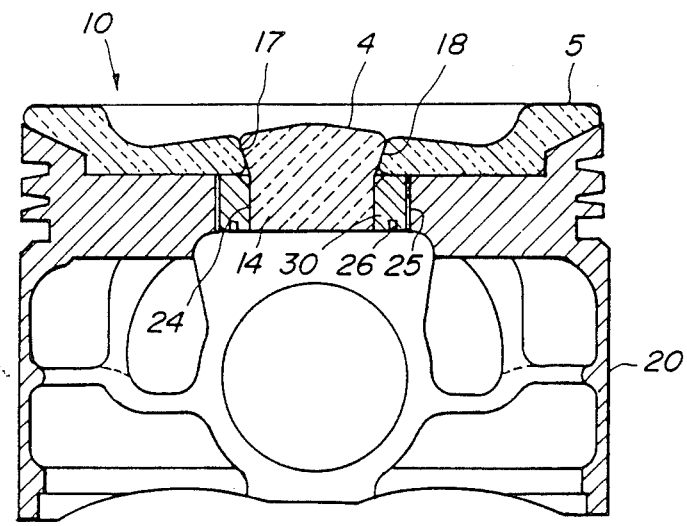
FIG. 2 is a vertically sectional view of the structure of another embodiment of the internal combustion engine piston according to the present invention.

FIG. 2 is a vertically sectional view of another embodiment of the internal combustion engine piston according to the present invention in which one of ceramic pieces constituting a piston cap is fixed to a metal piston body through a metallic member secured to said one of the ceramic pieces thereto, and the remaining ceramic pieces is fixed to the metal piston body by said one of the ceramic pieces already fixed to the piston body. This piston comprises the piston cap 10 consisting of ceramic pieces 4 and 5 made of zirconica, an annular metallic member 30 secured to the ceramic piece 4 and the piston body 20 made of nodular graphite cast iron.

While the piston body 20 may be made of an aluminum alloy, the ceramic piece 5 may be made of silicon nitride. The ceramic piece 4 is fixed to the metal piston body through the metallic piece 30 secured to a cylindrical projection 14 of the ceramic piece. The ceramic piece 5 is fixed onto the metal piston body while the inclined inner surface 18 of the through hole at the central portion of the ceramic piece and the inclined outer peripheral surface 17 of the ceramic piece 4 are abutted against each other. The fixing of the metallic member 30 and the ceramic piece 4 may be performed by shrinkage fitting, press fitting or bonding the projection 14 into the through hole 24 formed in the metallic member 30 or bonding them through a metallized layer formed on the outer periphery of the projection 14.

The metallic member 30 and the metal piston body 20 are fixed together through fitting, or screwing between a male screw formed on the outer periphery of the metallic member 30 and a female screw formed in the through hole 25 of the metal piston body 20. At the lower edge portion of the metallic member 30 may be formed a small hole 26 for facilitating the screwing.

This piston may be produced, for instance, by the following process.

First, the ceramic pieces 4 and 5 are fired, and machined into specified profiles, respectively. Particularly, the ceramic piece 4 and the ceramic piece 5 are machined such that the contact surfaces 17 and 18 are smoothly brought into contact with each other. Then, after the cylindrical projection 14 of the ceramic piece 4 is inserted into the through hole at the central portion of the ceramic piece 5, the annular metallic piece 30, having the male screw on the outer peripheral portion thereof, is shrinkage fitted to the projection 14. The metallic piece 30 is preferably made of an iron alloy such as cast iron, steel, stainless steel, and Fe-Ni alloy.

When the inner diameter of the metallic member 30 is rapidly shrunk due to a small heat capacity thereof to make the stable shrinkage fitting difficult, it is preferable that the metallic member 30 is screwed to a jig, having a larger heat capacity, by using the thread on the outer periphery of the metallic member, and the metallic member is heated together with the jig to perform the shrinkage fitting.

On the other hand, the through hole 25 having the female screw, to which is screwed the metallic member 30 and the depression of a specified size to which the piston cap is to be arranged, are formed at the top portion of the metal piston body 20. Then, the metallic member and the metal piston body are fixed together by screwing the male screw on the outer periphery of the annular metallic member 30 which is secured to the ceramic piece 4 and the female screw of the through hole 25. The ceramic piece 5 is fixed onto the metal piston body in the state that the inclined surface 17 of the ceramic piece 4 is brought into contact with the inclined surface 18 of the ceramic piece 5.

Since this method necessitates no thermal treatment in joining the metal piston body and the ceramic piston cap, it is a preferable method for bonding the ceramic piston cap to the piston body made of a metal with a low melting point, such as an aluminum alloy, or the piston body of which the mechanical strength is increased through the thermal treatment. The rotation of the ceramic piece 5 may be restricted by a pin (not shown) or other conventional means.

Figure 3:
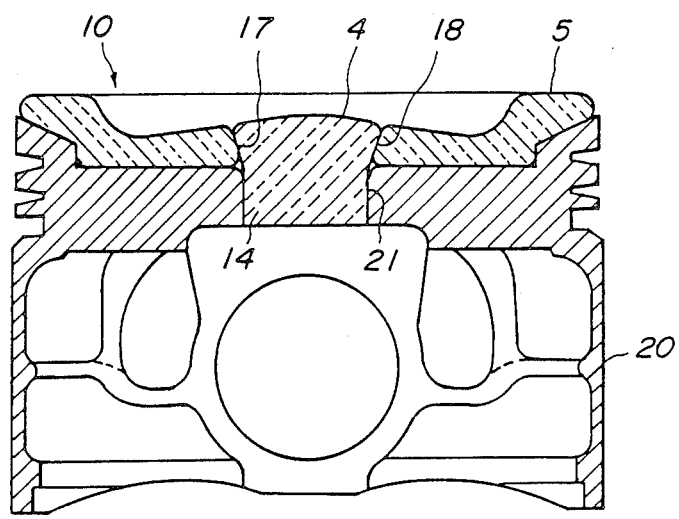
FIG. 3 is a vertical sectional view of a further embodiment of the internal combustion engine piston according to the present invention.

FIG. 3 is a vertically sectional view of still another embodiment of the internal combustion engine piston according to the present invention in which one of ceramic pieces constituting a piston cap is directly fitted and fixed to a metal piston body, and the remaining ceramic piece is fixed to the metal piston body by means of said one ceramic piece. The piston is constituted by the piston cap 10 consisting of the ceramic piece 4 made of zirconia and the ceramic piece 5 made of silicon nitride and the metal piston body 20 made of nodular graphite cast iron. A cylindrical projection 14 formed in the ceramic piece 4 is directly fitted into a through hole 21 formed in the top portion of the metal piston body. The ceramic piece 5 is fixed onto the metal piston body 20 through the mutual abutment between the inclined surface 18 of the through hole at the central portion of the ceramic piece 5 and the inclined surface 17 of the ceramic piece 4.

This piston may be produced, for instance, by the following method.

The ceramic pieces are fired, and then machined into specified profiles. The contact surfaces 17 and 18 of the ceramic pieces 4 and 5 are preferably machined so that they may smoothly contact with each other at the use temperature of the piston. Then, a through hole 21a in which the cylindrical projection 14 of the ceramic piece 4 is to be shrinkage fitted and a depression into which a piston cap 10 is to be arranged, are formed in the top portion of the metal piston body.

The shrinkage fitting interference is so determined with due consideration being given to the coefficient of thermal expansion of the materials constituting the ceramic piece 4 and the metal piston body 20, the use temperature of the fitting portion and the dimension of the ceramic pieces, so that the tightening strength necessary at the use temperature of the piston may be assured.

Next, the ceramic piece 5 is arranged onto the top portion of the metal piston body 20, and the piston body with the ceramic piece is heated at a temperature lower than the transformation point of nodular graphite cast iron. Thereafter, the projection 14 of the ceramic piece 4, kept at ordinary temperature, is inserted into the through hole 21 to carry out the shrinkage fitting.

The shrinkage fitting temperature is preferably a temperature at which the diameter of the through hole 21 of the metal piston body 20 becomes larger by not less than 0.1 mm than the diameter of the projection 14 of the ceramic piece 4. If the difference in diameter between the through hole 21 and the projection 14 is less than 0.1 mm, it is difficult to carry out the stable shrinkage fitting operation. On the other hand, if the shrinkage fitting is performed at a temperature higher than the transformation point of the nodular graphite cast iron, the phase transformation takes place to cause expansion during cooling so that the necessary shrinkage fitting interference can not be obtained to lower the tightening force and the metallic structure changes. Thereby, the mechanical strength of the piston is unfavorably lowered.

As obvious from the foregoing, since the piston cap which is fixed to the top portion of the metal piston body of the internal combustion engine piston according to the present invention is constituted by a plurality of ceramic pieces, even when there is a large temperature difference between the surface of the piston cap which is subjected to the high temperature combustion gas and the bottom surface of the piston cap which is in contact with the metal piston body, the resulting thermal stress is so small that fracture due to the thermal stress of the piston cap does not occur. In addition, according to the internal combustion engine piston of the present invention, the dimension of each of the ceramic pieces constituting the piston cap can be made smaller with the profile thereof being simplified, fracture of the ceramic pieces due to the thermal stress does not take place even if the thickness of the ceramic piece is made thicker. Therefore, the combustion temperature can be raised even if the material constituting the metal piston body is not the thermal resistance material.

Moreover, according to the method of manufacturing the internal combustion engine piston of the present invention, since the ceramic piston cap and the metal piston body may be bonded together without employing a heating treatment, the ceramic piston cap can be fixed to the piston body made of a metal with a low melting point, such as an aluminum alloy, without relying upon the complicated manufacturing method such as insert casting. In addition, the ceramic piston cap can be also fixed to the aluminum alloy piston body, the mechanical strength of which has been increased through heat treatment, without deteriorating the mechanical strength.

As having been described in the above, the internal combustion engine piston according to the present invention may be designed to have an excellent heat insulating property and heat resistance, by utilizing the characteristics of the ceramics such as the heat insulating properties, the thermal resistance, and the corrosion resistance.

What is claimed is:

1. An internal combustion engine piston comprising a metal piston body having a top portion and a piston cap which includes a plurality of ceramic pieces, said piston cap being fixed to the top portion of the metal piston body, wherein the piston cap comprises at least one ceramic material, at least one of the ceramic pieces is provided with a cylindrical projection which is fixed to the metal piston body indirectly by engagement of the cylindrical projection with a metallic member, said metallic member being secured to the metal piston body by being screwed thereto, and any of said plurality of ceramic pieces not having said cylindrical projection are fixed to the metal piston body by said at least one ceramic piece having a cylindrical projection.

2. An internal combustion engine piston according to claim 1, wherein said plurality of ceramic pieces comprise a ceramic material selected from the group consisting of zirconia, alumina, silicon nitride, silicon carbide and sialon.

3. A method of producing an internal combustion engine piston by fixing a piston cap, which includes a plurality of ceramic pieces, onto a top portion of a metal piston body, which method comprises the steps of: forming the ceramic pieces from at least one ceramic material, forming a fitting projection on at least one of said plurality of ceramic pieces, securing a metallic member onto the projection, fixing the ceramic piece to the top portion of the metal piston body by screwing the metallic member into a feature selected from the group consisting of a through hole and a depression formed in the top portion of the metal piston body, and fixing any ceramic pieces not having said fitting projection therein onto the metal piston body by said at least one ceramic piece having a fitting projection.

* * * * *